United States Patent
Pinkovezky et al.

(10) Patent No.: US 10,230,775 B2
(45) Date of Patent: Mar. 12, 2019

(54) MESSAGE PIPELINE FOR SUGGESTING AUDIENCES OF THIRD-PARTY PUBLISHED ARTICLES

(71) Applicant: Microsoft Technology Licensing, LLC, Redmond, WA (US)

(72) Inventors: Aviad Pinkovezky, Los Altos, CA (US); Brian Learn-Hao Chang, Cupertino, CA (US); Huining Feng, Cupertino, CA (US); James Margatan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/953,911

(22) Filed: Nov. 30, 2015

(65) Prior Publication Data
US 2017/0155694 A1 Jun. 1, 2017

(51) Int. Cl.
*G06Q 50/00* (2012.01)
*H04L 29/06* (2006.01)
(Continued)

(52) U.S. Cl.
CPC ............ *H04L 65/403* (2013.01); *G06F 17/24* (2013.01); *G06F 17/30554* (2013.01);
(Continued)

(58) Field of Classification Search
CPC ......... G06F 17/30867; G06F 17/30554; G06F 17/24; G06Q 50/01; H04L 65/403; H04L 67/02; H04L 67/20; H04L 67/22
See application file for complete search history.

(56) References Cited

U.S. PATENT DOCUMENTS

| 9,363,325 B2 * | 6/2016 | Sacks .................... H04L 67/306 |
| 2008/0065604 A1 * | 3/2008 | Tiu ..................... G06F 17/30569 |

(Continued)

FOREIGN PATENT DOCUMENTS

| WO | WO-2015116583 A1 | 8/2015 |
| WO | WO-2017095778 A1 | 6/2017 |

OTHER PUBLICATIONS

"International Application Serial No. PCT/US2016/063927, International Search Report dated Jan. 25, 2017", 3 pgs.
(Continued)

*Primary Examiner* — John M Macilwinen
(74) *Attorney, Agent, or Firm* — Schwegman Lundberg & Woessner, P.A.

(57) ABSTRACT

The disclosed systems and methods are directed to monitoring events generated by a social networking service and determining whether the generated events relate to members of the social networking service. The events may be generated by members of the social networking service or by external websites being monitored by the social networking service. When the social networking service determines that an event relates to a given member, the social networking service may update the given member accordingly. The social networking service further conducts various types of processing on content associated with the event to determine whether the given member should be notified of the event. The types of processing performed on the content associated with the event depend on whether the event was generated by a member of the social networking service or by an external website. This processing helps to raise the given member's awareness of meaningful events.

20 Claims, 8 Drawing Sheets

(51) Int. Cl.
*G06F 17/30* (2006.01)
*G06F 17/24* (2006.01)
*H04L 29/08* (2006.01)

(52) U.S. Cl.
CPC ....... *G06F 17/30867* (2013.01); *G06Q 50/01* (2013.01); *H04L 67/02* (2013.01); *H04L 67/20* (2013.01); *H04L 67/22* (2013.01); *H04L 67/306* (2013.01)

(56) References Cited

U.S. PATENT DOCUMENTS

| | | | | |
|---|---|---|---|---|
| 2011/0082807 A1* | 4/2011 | Parekh | ................. | G06Q 10/107 705/319 |
| 2012/0079004 A1* | 3/2012 | Herman | ................. | H04L 67/26 709/203 |
| 2012/0233191 A1* | 9/2012 | Ramanujam | ...... | G06F 17/30867 707/758 |
| 2014/0244612 A1 | 8/2014 | Bhasin et al. | | |
| 2014/0366052 A1* | 12/2014 | Ives | ................. | H04N 21/23418 725/19 |
| 2014/0372423 A1* | 12/2014 | Majumder | ........ | G06F 17/30867 707/725 |
| 2015/0032653 A1* | 1/2015 | Iyer | ..................... | H04L 67/306 705/319 |
| 2015/0067048 A1 | 3/2015 | Kannan et al. | | |
| 2015/0317574 A1 | 11/2015 | Hull et al. | | |

OTHER PUBLICATIONS

"International Application Serial No. PCT/US2016/063927, Written Opinion dated Jan. 25, 2017", 7 pgs.

"International Application Serial No. PCT/US2016/063927, International Preliminary Report on Patentability dated Jun. 14, 2018", 9 pgs.

\* cited by examiner

MESSAGE PIPELINE FOR SUGGESTING AUDIENCES OF THIRD-PARTY PUBLISHED ARTICLES

TECHNICAL FIELD

The subject matter disclosed herein generally relates to a system and method for monitoring and identifying different types of events generated by different sources, and notifying a member of the social networking service of particular events through a centralized notification hub accessible by the member.

BACKGROUND

Online social networking services provide users with a mechanism for defining, and memorializing in a digital format, their relationships with other people. This digital representation of real-world relationships is frequently referred to as a social graph. Many social networking services utilize a social graph to facilitate electronic communications and the sharing of information between its users or members. For instance, the relationship between two members of a social networking service, as defined in the social graph of the social networking service, may determine the access and sharing privileges that exist between the two members. As such, the social graph in use by a social networking service may determine the manner in which two members of the social networking service can interact with one another via the various communication and sharing mechanisms supported by the social networking service.

The social networking service may support an organization or an individual as a member. When an organization joins as a member, the organization may engage with other individual or organizational members of the social networking service. However, as the social networking service may have millions of members, it may be difficult for the organization to track and monitor events by other individual members or organizational members that may be relevant to the organization. Thus, the organization may miss out on opportunities to broaden a target audience or to enhance its public image with other members of the social networking service.

BRIEF DESCRIPTION OF THE DRAWINGS

Some embodiments are illustrated by way of example and not limitation in the figures of the accompanying drawings.

DETAILED DESCRIPTION

Figure 1:
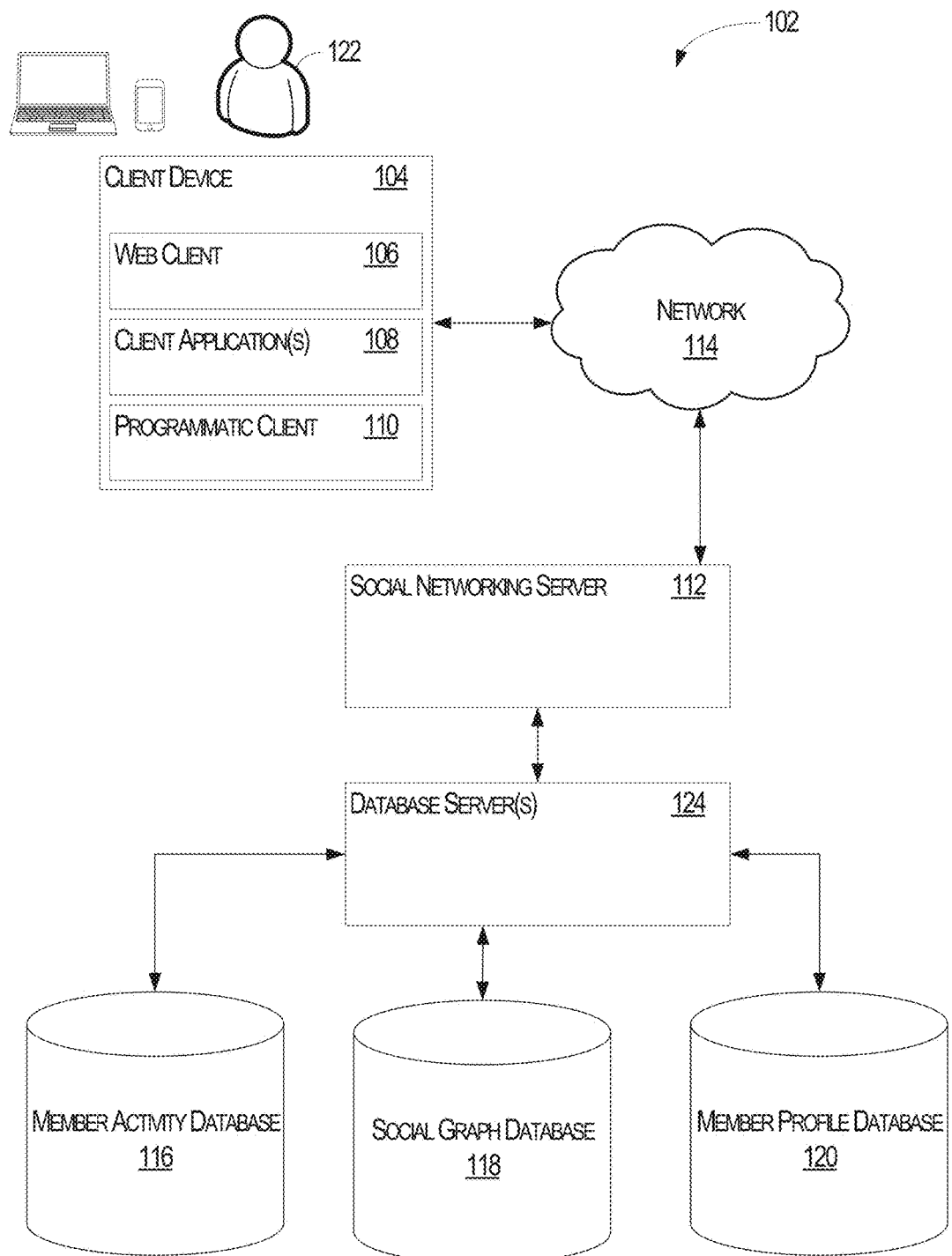
FIG. 1 is a block diagram of a system, in accordance with an example embodiment, for providing a social networking service.

Example methods and systems are directed to monitoring events that are generated from members of a social networking service and from third-party websites external and/or operated apart from the social networking service. For member-generated events, these events include instances where a member takes an action with respect to an item of interest or content posted or provided by the member or other members. In one embodiment, these member-generated events include a news article or other audiovisual content (e.g., a blog posting, an image, a video, a podcast, etc.) and an action taken with respect to the content. In this regard, and action may include, but is not limited to, indicating an agreement with the content (e.g., "liking" the content), posting a hyperlink to the content, providing a "status update" that includes the content or hyperlink to the content, and other such actions available to the member on the social networking service. For external website events, these events include posting, or otherwise making publicly available, content that may be viewed by members of the social networking service. In addition, the external website events are processed to determine whether such external website events mention a member (e.g., a personal member or organizational member) of the social networking service.

Subject to further analysis and filtering, as discussed below, the monitored events are communicated to a centralized notification center viewable by an administrative member of an organizational member of the social networking service. In this way, the administrative member is made aware, in substantially real-time or near real-time, of events that may be relevant or important to the organizational member. However, as the social networking service may have hundreds of thousands of members, it can be challenging for the administrative member to focus on those events that may be most relevant to the organizational member.

Accordingly, the monitored events are processed through corresponding analytic pipelines that assess the content associated with the event with the goal of finding those events that may be the most relevant to the administrative member and/or the organizational member. In this regard, the social networking service establishes individual pipelines that are comprised of various analytic engines, which assign scores or values to different attributes of the content associated with the member-generated events or the third-party events. As examples, such attributes may include, but are not limited to, the tone of the content, the website from which the content originated, whether other members of the social networking service have taken an action with respect to the content (e.g., whether the content is "trending"), and the overall relevance of the content based upon the foregoing attributes. Thereafter, the monitored events are subjected to one or more filters corresponding to the analyzed attributes of the monitored events. In one embodiment, the filters serve to filter out, or prevent the display of, events that the administrative member has indicated preferring not to see. In this regard, while a monitored event may mention an organizational member associated, the event is not presented to the administrative member for the organizational member unless it meets one or more criterion defined by the administrative member.

This process is technically beneficial because it reduces the amount of time and computing resources conventionally needed by the administrative member to review and identify those events that are relevant to the organizational member. Instead of having to manually review hundreds or thousands of events, each somehow mentioning or relating to the organizational member, the number of events are reduced to the tens or dozens, the review of which is a feasible task for the administrative member to undertake. Prior to this disclosure, reviewing the hundreds or thousands of events would have required thousands of man-hours and a significant amount of resources by the organizational member. From the perspective of the social networking service, the time spent in the review of events meant less time that the organizational member or the administrative member engaged the services provided by the social networking service. Thus, this disclosure benefits both the social networking service and the members that use such service.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident, to one skilled in the art, however, that the present subject matter may be practiced without these specific details.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), an application 108, and a programmatic client 110 executing on client device 104. The social networking server 112 is further communicatively coupled with one or more database servers 124 that provide access to one or more databases 116-120.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronics, or any other communication device that a user 122 may utilize to access the social networking server 112. In some embodiments, the client device 104 may comprise a display module (not shown) to display information (e.g., in the form of user interfaces). In further embodiments, the client device 104 may comprise one or more of a touch screens, accelerometers, gyroscopes, cameras, microphones, Global Positioning System (GPS) devices, and so forth. The client device 104 may be a device of a user 122 that is used to perform one or more searches for user profiles accessible to, or maintained by, the social networking server 112.

In one embodiment, the social network server 112 is a network-based appliance that responds to initialization requests or search queries from the client device 104. One or more users 122 may be a person, a machine, or other means of interacting with client device 104. In various embodiments, the user 122 is not part of the network architecture 102, but may interact with the network architecture 102 via the client device 104 or another means. For example, one or more portions of network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 122, to identify or locate other connected members, etc.). Conversely, if the social networking server access client is not included in the client device 104, the client device 104 may use its web browser to access the initialization and/or search functionalities of the social networking server 112.

One or more users 122 may be a person, a machine, or other means of interacting with the client device 104. In example embodiments, the user 122 is not part of the network architecture 102, but may interact with the network architecture 102 via the client device 104 or other means. For instance, the user 122 provides input (e.g., touch screen input or alphanumeric input) to the client device 104 and the input is communicated to the network architecture 102 via the network 114. In this instance, the social networking server 112, in response to receiving the input from the user 122, communicates information to the client device 104 via the network 114 to be presented to the user 122. In this way, the user 122 can interact with the social networking server 112 using the client device 104.

Further, while the client-server-based network architecture 102 shown in FIG. 1 employs a client-server architecture, the present subject matter is, of course, not limited to such an architecture, and could equally well find application in a distributed, or peer-to-peer, architecture system, for example.

In addition to the client device 104, the social networking server 112 communicates with other one or more database server(s) 124 and/or database(s) 116-120. In one embodiment, the social networking server 112 is communicatively coupled to a member activity database 116, a social graph database 118, and a member profile database 120. The databases 116-120 may be implemented as one or more types of databases including, but not limited to, a hierarchical database, a relational database, an object-oriented database, a graph database, one or more flat files, or combinations thereof. Examples of graph databases include, but are not limited to, Neo4j, which is available from Neo Technology, Inc., Giraph, which is available from The Apache Software Foundation, and GraphLab, which is available from Dato, Inc.

The member profile database 120 stores member profile information about members who have registered with the social networking server 112. Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120.

Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

For members associated with an organization, the member profile database 120 may include an identification as to whether a given member is authorized to act on the organization's behalf. Thus, the authorized member may disseminate information, endorsed by the organization, to other members of the social networking service. In this manner, an organization may inform other members of the social networking service, individuals and organizations, of news and/or events that may be relevant to the organization. For example, the organization may disseminate information about a new product, an industry event, a news item, or other information to other members of the social networking service. The organization may also disseminate such information to members of the social networking service that have elected to "follow" the organization or have elected to subscribe to information provided by the organization.

Members of the social networking service provided by the social networking server 112 may establish connections with one or more members and/or organizations of the social networking service. The connections may be defined as a social graph, where the member and/or organization is representative by a node in the social graph and the edges identify connections between nodes. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the nodes representing the members; otherwise, members are said to be "nth"-degree connections where "n" is defined as the number of edges separating two nodes. As an example, two members are said to be "2nd-degree" connections where each of the members share a connection in common, but are not directly connected to one another. In one embodiment, the social graph maintained by the social networking server 112 is stored in the social graph database 118. Although the foregoing discussion refers to "social graph" in the singular, one of ordinary skill in the art will recognize that the social graph database 118 may be configured to store multiple social graphs.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

In addition, as members interact with the various applications, services, and content via the social networking service, the social networking service generates events in response to such interactions. Each event is associated with an event type, which identifies the type of event that the member generated or caused. Examples of event types include, but are not limited to, a "like" event type, a "share" event type, a "mention" event type, a "comment" event type, a "job change" event type, a "title change" event type, and other such event types. As suggested by the name associated with the event type, the "like" event type is associated with an event where a member "likes" content that has been posted to the social networking service, the "share" event type is associated with an event where a member selects to share posted content with other members, the "mention" event type is associated with an event where a member is mentioned in posted content, and so forth. As discussed below with reference to FIGS. 3-6, the event generated in this manner may include one or more fields that identify the action that generated the event (e.g., the event type) and the content (or a URL to the content) associated with the event. In this disclosure, the events that are monitored and processed are those events being associated with content that mentions, or is associated with, an organizational member of the social networking service.

As discussed below with reference to FIGS. 2-6, the social networking service generates an event in response to a member interacting with the service, such as by selecting a hyperlink or submitting content, which is then stored in an event datastore. In one embodiment, the events are monitored in substantially real-time, such as near the time the event was generated. In another embodiment, the events are monitored at periodic time intervals, such as by monitoring the event datastore for added events.

In one embodiment, the social networking server 112 communicates with the various databases 116-120 through one or more database server(s) 124. In this regard, the database server(s) 124 provide one or more interfaces and/or services for providing content to, modifying content, removing content from, or otherwise interacting with the databases 116-120. For example, and without limitation, such interfaces and/or services may include one or more application programming interfaces (APIs), one or more services provided via a service-oriented architecture (SOA), one or more services provided via a REST-oriented architecture (ROA), or combinations thereof. In an alternative embodiment, the social networking server 112 communicates with the databases 116-120 and includes a database client, engine, and/or module, for providing data to, modifying data stored within, and/or retrieving data from, the one or more databases 116-120.

One of ordinary skill in the art will recognize that the database server(s) 124 may include one or more different types of servers. For example, the database server(s) 124 may include a Microsoft® Exchange Server, a Microsoft® Sharepoint® Server, a Lightweight Directory Access Protocol (LDAP) server, any other server configured to provide user profile information, or combinations thereof. Accordingly, and in one embodiment, the servers in communication with the social networking server 112 are configured to access the various databases 116-120 and retrieve or store corresponding information.

Figure 2:
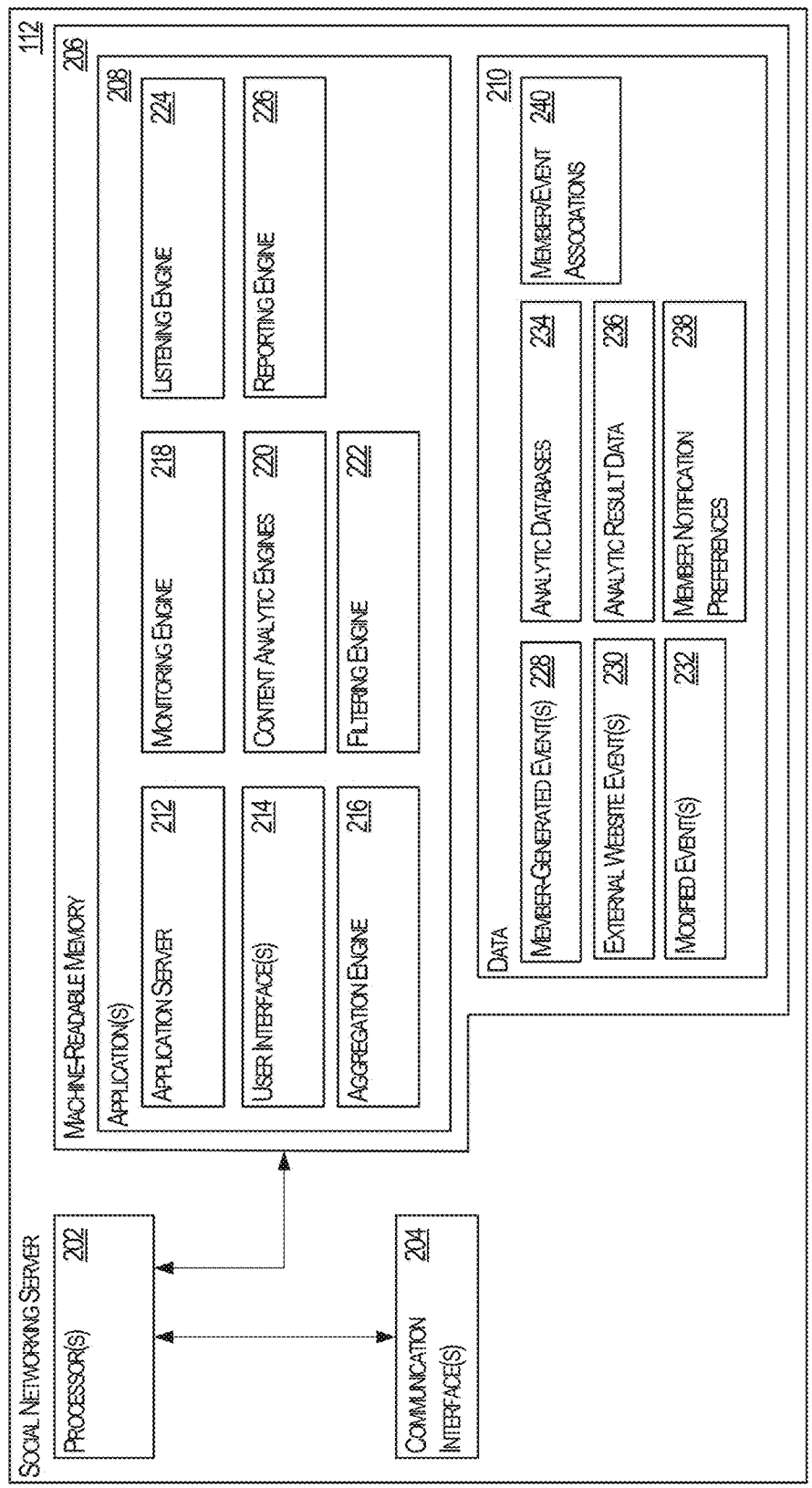
FIG. 2 is a block diagram illustrating the social networking server shown in FIG. 1, in accordance with an example embodiment.

FIG. 2 illustrates the social networking server 112 of FIG. 1, in accordance with an example embodiment. In one embodiment, the social networking server 112 includes one or more processor(s) 202, one or more communication interface(s) 204, and a machine-readable memory 206 that stores computer-executable instructions for one or more application(s) 208 and data 210 used to support one or more functionalities of the applications 208.

The various functional components of the social networking server 112 may reside on a single device or may be distributed across several computers in various arrangements. The various components of the social networking server 112 may, furthermore, access one or more databases (e.g., databases 116-120 or any of data 210), and each of the various components of the social networking server 112 may be in communication with one another. Further, while the components of FIG. 2 are discussed in the singular sense, it will be appreciated that, in other embodiments, multiple instances of the components may be employed.

The one or more processors 202 may be any type of commercially available processor, such as processors available from the Intel Corporation, Advanced Micro Devices, Texas Instruments, or other such processors. Further still, the one or more processors 202 may include one or more special-purpose processors, such as a field-programmable gate array (FPGA) or an application specific integrated circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors 202.

The one or more communication interfaces 204 are configured to facilitate communications between the social networking server 112, the client device 104, and one or more of the database server(s) 124 and/or database(s) 116-120. The one or more communication interfaces 204 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable memory 206 includes various applications 208 and data 210 for implementing the social networking server 112. The machine-readable memory 206 includes one or more devices configured to store instructions and data 210 temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable memory" should be taken to include a single medium or multiple media (e.g., a centralized or distributed database, or associated caches and servers) able to store the applications 208 and the data 210. Accordingly, the machine-readable memory 206 may be implemented as a single storage apparatus or device, or, alternatively and/or additionally, as a "cloud-based" storage systems or storage networks that include multiple storage apparatus or devices. As shown in FIG. 2, the machine-readable memory 206 excludes signals per se.

In one embodiment, the applications 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the applications 208 of the social networking server 112 include, but are not limited to, an application server 212, a user interface application 214, an aggregation engine 216, a monitoring engine 218, one or more content analytic engines 220 (discussed with reference to FIGS. 4-5), a filtering engine 222, a listening engine 224, and a reporting engine 226. The data 210 supporting these applications 208 include, but are not limited to, member-generated events 228, external website events 230, modified events 232, analytic databases 234, analytic result data 236, one or more member notification preferences 238 for various members, and one or more member/event associations 240.

The application server 212 is configured to provide access to one or more applications 208 of the social networking server 112. For example, the social networking server 112 provides access to one or more user interface applications 214 that provide various graphical interfaces to the one or more client devices 104. In one embodiment, the graphical user interfaces are provided using the Hypertext Transfer Protocol (HTTP). The graphical user interfaces are displayable by the client device 104 and accept input from the user 122 for interacting with the social networking server 112. Further still, the user interface applications 214 may be configured to provide such interfaces to one or more clients displayable by the client device 104, such as the web client 106, one or more client applications 108, or the programmatic client 110. In one embodiment, the user interface applications 214 provide the content requested by the one or more client devices 104 for displaying a centralized notification center. As discussed below, and with reference to FIG. 7, the centralized notification center provides a central location (e.g., a particular webpage) for an administrative member to view various events relating to an organization having a member profile maintained by the administrative member. In providing the centralized notification center, the application server 212 and the user interface application 214 interact with other applications 208 of the social networking server 112, such as the reporting engine 226 and the content analytic engines 220. The application server 212 and the user interface application 214 also retrieve and store various types of data 210, such as one or more modified events 232, analytic result data 236, one or more member notification preferences 238, and one or more member/event associations 240.

The aggregation engine 216 is configured to retrieve various items of content provided by one or more external websites controlled by third-parties. In this context, the social networking server 112, via the aggregation engine 216, treats the publication and/or availability of content from the external websites as "events." Accordingly, examples of events in this context include the publication of a news article by a news website, the publication of the video by the news website or a video hosting website, the publication of an image file or audio file by a third-party website, and other such publications. Furthermore, the publication of the content should be considered as merely one manner in which the aggregation engine 216 may define an event; in other instances, the aggregation engine 216 may define an event as identifying content as "new" to the aggregation engine 216 (e.g., an item of content not having been previously encountered). In one embodiment, the aggregation engine 216 is implemented as an API to a feed reader or blog reader, such as Feedly, which is available via the website of feedly.com. In an alternative embodiment, the aggregation engine 216 is implemented as a stand-alone client executable by the one or more processors 202, such as LinkedIn Pulse, which is available from LinkedIn.com.

Referring briefly to the data 210, the events aggregated by the aggregation engine 216 are stored as the external website events 230. Similarly, events generated by members of the social networking service provided by the social networking server 112 are stored as the member-generated events 228. As discussed above with regard to FIG. 1 and the member activity database 116, the social networking service monitors and stores events generated by the members of the social networking service. Although the events generated by members and third-parties are stored in one or more datastores, the social networking server 112 processes each of these two different types of events through different processing pipelines, which is the discussed below with reference to FIGS. 3-6.

The monitoring engine 218 is configured to monitor events generated by members of the social networking service or by the third-party websites. In one embodiment, the monitoring engine 218 monitors events in a near real-time basis, detecting an event as a new event each time the event is added to the event datastore. In an alternative embodiment, the monitoring engine 218 detects whether events added to the event datastore are new events on a periodic basis (e.g., every five minutes, every 10 minutes, once an hour, etc.). When a new event is detected, the monitoring engine 218 is configured to communicate or transfer the detected event to a pipeline of analytic engines for additional processing. In one embodiment, the social networking server 112 establishes a pipeline for processing member-generated events 228 and a pipeline for processing events generated by 3rd-parties. As discussed below, the processing of a given event yields a modified event (e.g., the modified events 232), where the modified event includes additional analytic result data 236 to facilitate a determination of whether the event should be communicated to an administrative member for display via the centralized notification center. In one embodiment, the monitoring engine 218 is implemented as LinkedIn® Burrow™, which is available from LinkedIn Corp. As another example, the monitoring engine 218 is implemented as Logstash®, which is available from the Elasticsearch BV Corporation, located in Amsterdam, the Netherlands.

The content analytic engines 220 include various engines configured to analyze the content associated or corresponding to an event. As discussed below with reference to FIGS. 4-5, these engines include a trending analytic engine, a qualitative engine, a tone analytic engine, and an event update engine. These engines analyze the content corresponding to an event and assign a value or identifier that indicates whether the content is trending, the quality of the content, the tone of the content, whether one or more member profiles are associated with the content, and the overall relevance of the content. The content analytic engines 220 retrieve and store data 210 from various analytic databases 234, such as a trending database, a qualitative database, and a tone database. Each of these engines 220 and databases 234 are discussed further below with reference to FIGS. 4-5.

After processing, a given event is modified to include analytic result data. In one embodiment, this analytic result data is stored as analytic result data 236. The analytic result data 236 is then used by a filtering engine 222 to determine whether the corresponding event is to be presented to an administrative member of the organizational member associated or identified by the event. In making this determination, the filtering engine 222 leverages one or more preferences (e.g., member notification preferences 238) established by the administrative member in making this determination. In this way, the administrative member can establish preferences 238 then indicate whether he or she prefers to be notified of all events associated with an organizational member or particular events, such as events associated with content of a high-quality or events associated with content having a particular tone or trend analysis.

The listening engine 224 is configured to listen for events having passed the filtering engine 222. As discussed below with reference to FIG. 6, the listening engine 224 includes various modules configured to handle events associated with specific event types (e.g., a "like" event, a comment event, a sharing event, a mention event, etc.). In one embodiment, the listening engine 224 is implemented as Apache Flume™, which is available from The Apache Software Foundation. In other embodiment, the listening engine 224 is implemented as LinkedIn® Burrow™.

While FIG. 1 illustrates a single block for the listening engine 224, in alternative embodiments, the social networking server 112 may instantiate a listening engine 224 for each of the member profiles of the social networking service. Additionally or alternatively, the social networking server 112 may instantiate one or more listening engines 224 for selected member profiles, such as organizational member profiles. In this way, an organizational member is associated with a corresponding listening engine 224, which handle events associated with, or corresponding to, the organizational member. As events are processed by the listening engine 224, and association is established between the processed event and the corresponding member. Accordingly, such associations are stored as the member/event associations 240. These associations are then stored in a member/event association database, which is leveraged by the reporting engine 226 to present events to the administrative member of the organization via the user interface application 214 and one or more graphical user interfaces.

Figure 3:
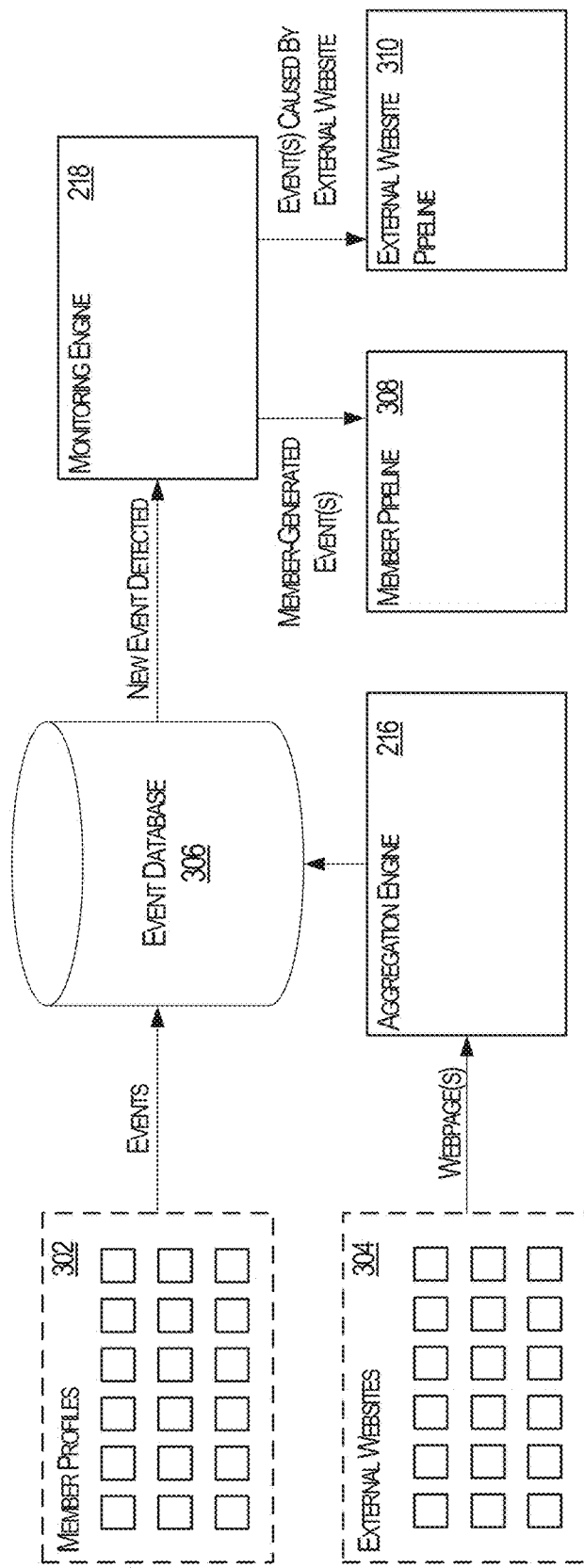
FIG. 3 is a block diagram illustrating directing generated events to one of two event pipelines, in accordance with an example embodiment.

FIG. 3 is a block diagram illustrating directing generated events to one of two event pipelines, in accordance with an example embodiment. As shown in FIG. 3, the members associated with the member profiles 302 of the social networking service generate events. As discussed previously, such events may be generated by performing a "like" action, posting a status update, commenting on a post or status update submitted by another member, and other such actions. The external websites 304 also generate events which are detected and monitored by the aggregation engine 216. In the embodiment shown in FIG. 3, the events generated by the external website 304 correspond to publicly available webpages. However, the events may also include the posting or providing of audiovisual content, such as videos, images, podcasts or audio files, and other such audiovisual content. The events generated by the members of the social networking service and the external websites 304 are communicated to an event database 306, which is communicatively coupled to the social networking server 112 either directly or via one or more database servers 124.

In one embodiment, the event database 306 stores event records, where an event record includes one or more of the following event record fields: an originating member profile identifier, a member profile identifier corresponding to the member acting on the content associated with the event, one or more member profile identifiers corresponding to organizational or personal members linked (e.g., having been mentioned or associated with) to the event, a hyperlink or URL to the content associated with the event, the type of action that caused or generated the event, and/or any external websites 304 associated with the event (e.g., the external website 304 from which content associated with the event originates). The foregoing event record fields are meant to be illustrative and not exhaustive, and one of ordinary skill in the art may include alternative or different event record fields without departing from the scope of this disclosure.

As events are added to the event database 306, the monitoring engine 218 monitors for the new events. As discussed above, the monitoring engine 218 may monitor the additions in real-time or near real-time. In an alternative embodiment, or in some instances, the monitoring engine 218 may periodically monitor the event database 306, such as by determining whether new events have been added to the event database 306 at periodic intervals (e.g., every five minutes, every 30 minutes, once a day, and other such intervals of time). When a new event is detected, the monitoring engine 218 determines whether the event is a member-generated event 228 or an event generated by an external website 304. In one embodiment, the monitoring engine 218 makes this determination by analyzing one or more event record fields of the event record such as the originating member profile identifier or the external website field. Where the event is generated by an external website 304, the originating member profile identifier may be null, which signals to the monitoring engine 218 that the event was generated by an external website 304. In an alternative embodiment, the event record includes an origination field that indicates whether the event was generated by a member of the social networking service or by an external website 304.

Where the event is generated by a member, the monitoring engine 218 communicates the events to a member pipeline 308, which includes designated analytic engines communicatively coupled to form the member pipeline 308. Alternatively, where the event is generated by an external website 304, the monitoring engine 218 communicates the event to an external website pipeline 310, which also includes designated analytic engines communicatively coupled to form the external website pipeline 310. As discussed with reference to FIGS. 4-5, the member pipeline 308 and the external website pipeline 310 may leverage the same or different analytic engines.

Figure 4:
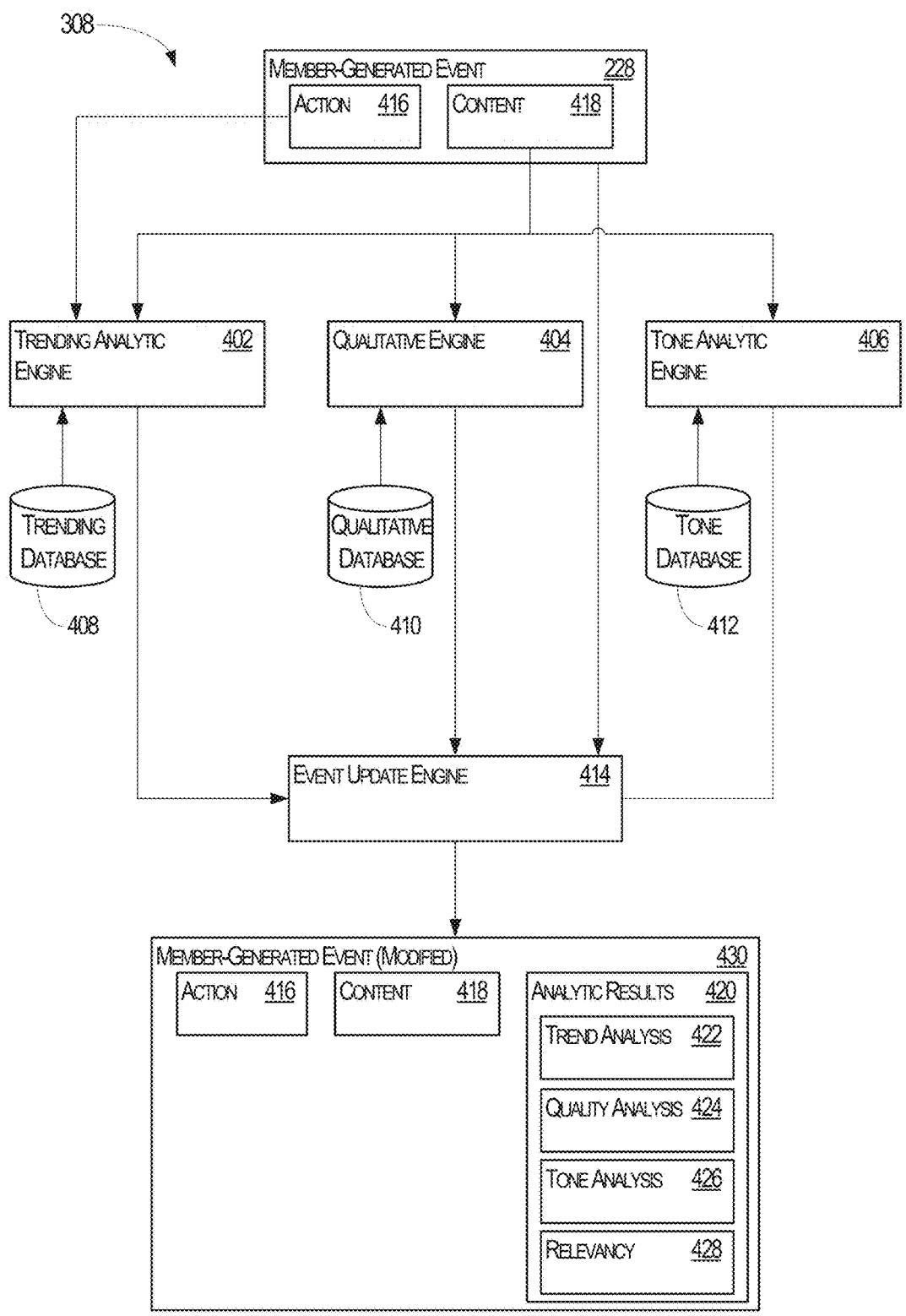
FIG. 4 is a block diagram illustrating a member pipeline for processing a member-generated event, in accordance with an example embodiment.

FIG. 4 is a block diagram illustrating the member pipeline 308 for processing a member-generated event 228, in accordance with an example embodiment. In one embodiment, the member pipeline 308 includes a trending analytic engine 402, a qualitative engine 404, and a tone analytic engine 406. Each of the engines 402-406 are communicatively coupled to a corresponding database, and in particular, a trending database 408, a qualitative database 410, and a tone database 412. In addition, the member pipeline 308 includes an event update engine 414, which updates the member-generated event 228 in response to the analytic processing by the engines 402-406. As a result of action by the event update engine 414, the member pipeline 308 produces a modified member-generated event 430.

The trending analytic engine 402 is configured to determine whether content 418 associated with the member-generated event 228 is trending among the members of the social networking service. In one embodiment, the trending analytic engine 402 is implemented as Apache Storm™, which is available from The Apache Software Foundation.

In one embodiment, the trending analytic engine 402 processes the action 416 (e.g., the "like" action, the mention action, the common action, or other such action) that resulted in the generation of the member-generated event 228. The trending database 408 includes one or more event records that correlate member profiles 302 with the content 418 and/or the action 416. The trending analytic engine 402 queries the trending database 408 to return a listing or numerical value of the number of event records where the content 418 is associated with one or more member profiles 302. This query may also be time-limited such that the trending database 408 returns the numerical value for a requested timeframe (e.g., the previous two weeks, the last six months, the previous day, or other requested timeframe). In this manner, the trending analytic engine 402 determines whether the content 418 associated with the member-generated event 228 is popular, or becoming popular, among the members of the social networking service.

Depending on the number of records that results from the query, the trending analytic engine 402 assigns a trend analysis value to the content 418. In one embodiment, the trend analysis value is a scaled value corresponding to the number of records associated with the content 418. For example, the trend analysis value may be a ratio of the number of event records for a given timeframe compared with the number of event records that are associated with the content 418 for the same timeframe. In addition, the type of action 416 associated with the event may be considered in the trend analysis such that particular actions 416 are assigned a greater value than other actions 416. For example, a "like" action 416 may be assigned a higher value than a mention action 416 (or vice versa). In this manner, the type of action 416 associated with a particular piece of content 418 may serve as an indicator as to whether the content 418 is trending compared with other content 418. Thus, while a first piece of content 418 may be associated with 400 "likes," a second piece of content 418 may be associated with 200 "mentions," which may indicate that the members who are mentioning the second piece of content 418 are more engaged with it. Thus, the second piece of content 418 may be considered trending over the first piece of content 418.

In addition to the trend analysis, the member-generated event pipeline 308 also includes a qualitative analysis of the content 418 performed by a qualitative engine 404. In one embodiment, the qualitative engine 404 is configured to determine the quality of the content 418, which can be used as an indicator in determining whether an administrative member should be notified of the event. One example of a qualitative engine 404 is LinkedIn® Pinot™, which is available from LinkedIn Corp.

In one embodiment, the qualitative engine 404 assigns a quality analysis value to the member-generated event 228 according to the originating source of the content 418. In this regard, the qualitative engine 404 leverages a qualitative database 410, which includes one or more records indicating the quality of various origination sources. An origination source (or origin source) is the source from which the content 418 originates or from which one or more articles mentioned or linked in the content 418 originates. In one embodiment, the rows of the qualitative database 410 correspond to websites from which content 418 is available, and each row is associated with a quality score. In some instances, the quality score may be positive or negative. For example, a first website may have a positive score, which indicates that the first website provides relatively high quality content 418, whereas a second website may have a negative score, which indicates that the second website provides relatively low quality content 418. In alternative instances, this quality score may take on a range of values, such as from 0 to 100. In this alternative example, a website having a low score indicates that the website provides low-quality content 418 whereas a website having a high score indicates that the website provides high-quality content 418.

While the quality score may be subjective, this quality score may be assigned using various techniques, such as crowdsourcing techniques where members of the social networking service are asked or requested to provide values or scores to selected websites. Another technique is where editors or operators of the social networking service assign scores manually to the qualitative records of the qualitative database 410. Yet a further technique is to employ an API to retrieve review scores from review aggregation websites that provide a measure of quality for sources of content 418. Furthermore, multiple techniques may be employed, such as where the crowdsourcing technique fails to attract a predetermined threshold number of responses (e.g., 50% of the members of the social networking service) or where the review aggregation website has not yet reviewed a particular source of content 418.

Where the member-generated event 228 includes content 418 from a single origination source, the qualitative engine 404 assigns a quality analysis value to the member-generated event 228 corresponding to the quality value associated with the single origination source. However, in many instances, the content 418 will include articles or audiovisual content from different originating sources (e.g., where the member links to, comments on, or mentions content 418 provided from different websites). In these instances, the quality analysis value assigned to the member-generated event 228 is a combination of the quality values for the various originating sources. In one embodiment, this combination is a summation of the quality values. However, other combinations are also possible, such as by applying a weighting factor to the quality value assigned to particular originating sources (e.g., sources associated with a quality value over a predetermined threshold may be assigned a weighting factor of 0.5 or greater) to increase the overall quality analysis value applied to the member-generated event 228 in a situation where there may be one or more lower quality originating sources associated with the content 418. The quality analysis value may also be an average of the quality values corresponding to the originating sources associated with the content 418. In this manner, the qualitative engine 404 assesses the quality of the content 418 associated with the member-generated event 228 in instances where a single originating source is mentioned or where multiple originating sources are mentioned.

The tone analytic engine 406 is configured to assign a tone analysis value to the member-generated events 228. The tone analysis value signals whether the tone of the content 418 is generally positive or generally negative. In this regard, the tone analytic engine 406 references to a tone database 412 where the tone database 412 stores one or more records, where each record includes a word or phrase and is associated with a corresponding value (e.g., a positive value or a negative value). For instance, the word "excellent" can be associated with a positive value whereas the phrase "poor performance" can be associated with a negative value. In this regard, the tone analytic engine 406 performs natural language processing on the content 418, including articles linked to or mentioned by the content 418, to assess whether the member-generated event 228 is a generally positive event or a negative event.

In context, this is to provide the administrative member with the notification of whether the organizational member is being associated with positive or negative events. For example, the administrative member may prefer not to be notified of negative events as these may be the type of events the administrative member prefers not to share with other members of the social networking service. In contrast, the administrative member may prefer to be notified of positive or fairly positive events, as these may be the type of events administrative member would want to share with other members of the social networking service.

In determining whether a member-generated event 228 is positive or negative, the tone analytic engine 406 or the social networking server 112, may establish a gradient scale (e.g. a scale of 0 to 1, a scale of 0 to 100, a scale of 0 to 1000, etc.), where various ranges along the gradient scale correspond to various types of positive values or negative values. For example, where the scale is 0 to 100, a value in the range of 0 to 10 may indicate that the member-generated event 228 is predominantly negative whereas a value in the range of 90 to 100 may indicate that the member-generated event 228 is mostly or greatly positive. In calculating this value, the tone analytic engine 406 may perform a summation of the various values corresponding to identified words or phrases in the content 418, which includes comments or remarks made by the member and any articles or items of interest linked or mentioned. In this manner, the tone analytic engine 406 facilitates the notification of member-generated event 228 according to the event's overall tone.

After the member-generated event 228 is analyzed and processed, the event update engine 414 updates the member-generated event 228. In one embodiment, updating the member-generated event 228 includes modifying the structure of the member-generated event 228 to include an additional set of analytic results 420. As discussed above, the analytic results 420 include a trend analysis value 422, a quality analysis value 424, a tone analysis value 426, and a relevancy value 428. In one embodiment, the relevancy value 428 is determined from a combination of one or more of the analytic results 420. For example, the relevancy value 428 may be a summation or average of the analytic results 420 (e.g., values 422-426). In this context, the relevancy value 428 serves as an overall measure for the modified member-generated event 430. This overall measure may be used by one or more engines in the notification process, discussed further below, for notifying the administrative member of the original member-generated event 228. In particular, the relevancy value 428 may serve as a measure for whether a given event is relevant.

For example, the contents associated with a member-generated event 228 may be overwhelmingly positive and may have been linked or mentioned by other members (e.g., the content 418 is trending among 2% of the members of the social networking service). These two characteristics would initially seem to indicate that the content 418 would be the type that an organizational member would want to highlight or share with other members of the social networking service. However, the originating sources of the content 418 may be known to be low quality sources or sources known to provide false or misleading content 418. Accordingly, the quality analysis value 424 will be a low or lower value, and this value would reduce or diminish the relevancy value 428. Thus, the relevancy value 428 may serve as an additional metric along which an administrative member can use to filter out certain types of member-generated events 228.

Figure 5:
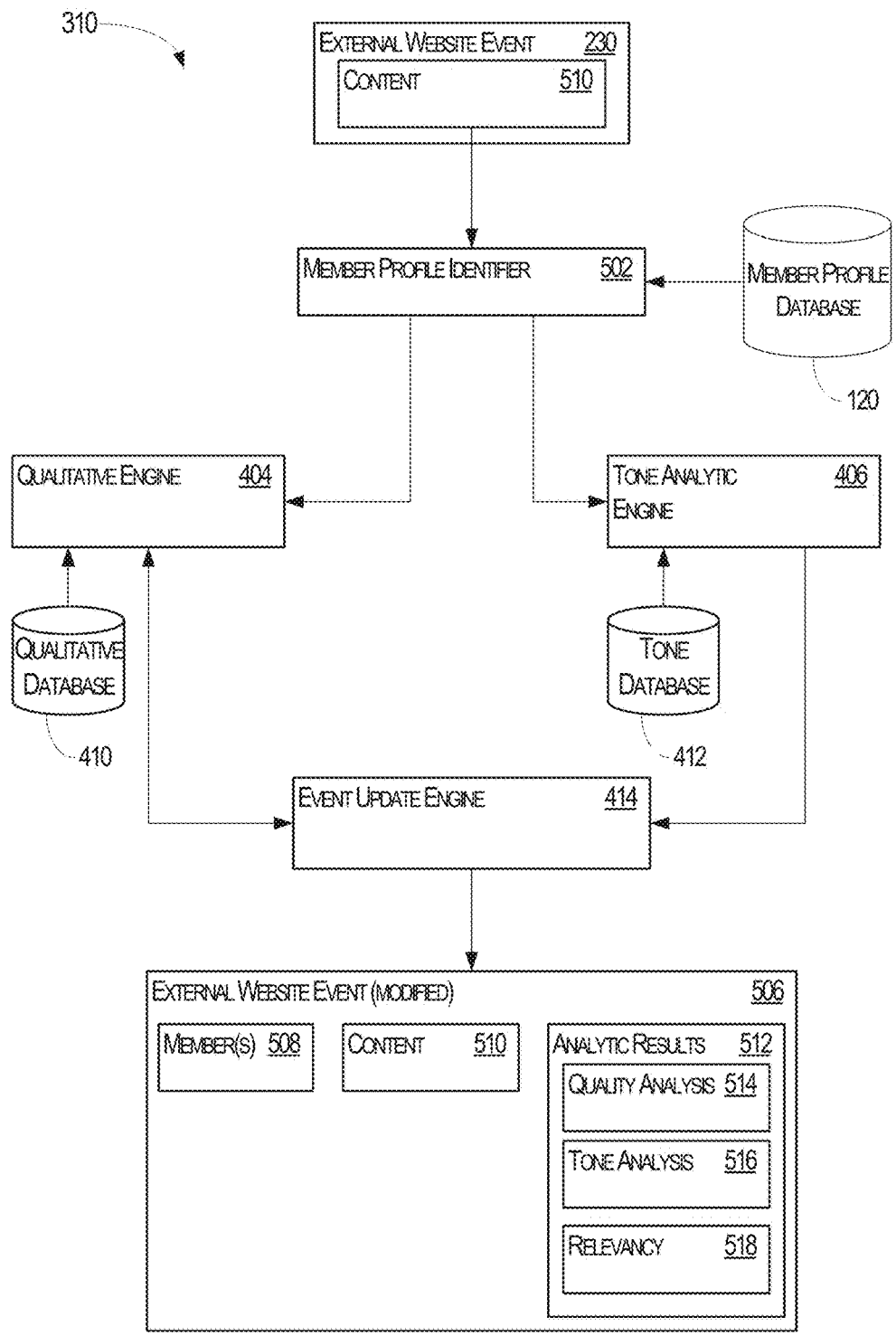
FIG. 5 is a block diagram illustrating an external website pipeline for processing a third-party-generated event, in accordance with an example embodiment.

In addition to the member pipeline 308 discussed in FIG. 4, the social networking server 112 also establishes an external website pipeline 310 for processing events generated or caused by external websites 304. FIG. 5 is a block diagram illustrating the external website pipeline 310 for processing a third-party-generated event, in accordance with an example embodiment. As shown in FIG. 5, the external website pipeline 310 includes a member profile identifier 502 communicatively coupled to the qualitative engine 404 and the tone analytic engine 406. The qualitative engine 404 and the tone analytic engine 406 are each communicatively coupled to the event update engine 414. The external website pipeline 310 receives an external website event 230 and outputs a modified external website events 506.

In one embodiment, the member profile identifier 502 is configured to determine whether the content 510 of the external website event 230 mentions or references a member having a profile with the social networking service. In this regard, the member profile identifier 502 performs natural language processing on the content 510 to identify nouns or proper names, and then cross-references the identified nouns or proper names with the member profile database 120. Where an identified noun or proper name corresponds to a member profile of the member profile database 120, the member profile identifier 502 includes a field or "tag" identifying the corresponding member. In one embodiment, the field references a member profile identifier 502 (e.g., a key corresponding to the member profile record of the member profile database 120); however, in alternative embodiments, the field references the member profile name or acronym. In this manner, the member profile identifier 502 identifies whether the external website event 230 is to be associated with one or more member profiles 302 in view of the content 510 (e.g., a news article, a blog posting, an opinion piece) associated with the event 230.

While, in one embodiment, the member profile identifier 502 performs natural language processing on the content 510, the member profile identifier 502 may perform other operations depending on the content type. For example, where the content 510 is an image, the member profile identifier 502 performs optical character recognition or image recognition on the content 510 to determine whether it references or mentions a member of the social networking service. As another example, where the content 510 is an audio file, the member profile identifier 502 performs voice or speech recognition on the audio file and the results of the voice or speech recognition (e.g., a text transcript) are then provided as input to the natural language processing portion of the member profile identifier 502. Various optical character recognition techniques and voice recognition techniques are known to one of ordinary skill in the art of video and audio processing.

The external website event 230 is then processed by the qualitative engine 404 and the tone analytic engine 406. As discussed with reference to FIG. 4, the qualitative engine 404 is configured to assign a quality analysis value 424 to the event 230 and the tone analytic engine 406 is configured to assign a tone analysis value 426. The qualitative engine 404 is configured to process the external website event 230 similarly to how it processes member-generated events 228. More particularly, the qualitative engine 404 analyzes one or more originating sources associated with the content 510. For example, the content 510 may include a link or mention of a news article or image, and the qualitative engine 404 analyzes the website that provides the news article or image.

In addition, the tone analytic engine 406 is configured to process the external website event 230 similarly to how it processes the member-generated event 228. However, within the context of the pipeline 310, the tone analytic engine 406 also analyzes video content, image content and audio content. As discussed above with regard to the member profile identifier 502, where the content 510 includes a video or image, the tone analytic engine 406 applies one or more optical character recognition techniques or image processing techniques to determine the tone of the video or image content. In this regard, the tone database 412 may include one or more records corresponding to different types of images and these records may be associated with corresponding values indicating tone of such images. Where the content 510 includes audio the tone analytic engine 406 applies one or more speech recognition techniques to obtain a transcript of the audio, and then applies natural language processing techniques to identify specific words within the obtained transcript.

In this manner, the qualitative engine 404 and the tone analytic engine 406 obtain analytic results 420, which are provided to the event update engine 414. Accordingly, the event update engine 414 modifies the external website event 230 to include the analytic results 420 from the qualitative engine 404 and the tone analytic engine 406, as well as one or more member profile identifiers determined by the member profile identifier 502. As shown in FIG. 5, the event update engine 414 produces a modified external website event 506 that includes the one or more member profile identifiers 502, the content 510, and the analytic results 512. The analytic results 512 include a quality analysis value 514, a tone analysis value 516, and the relevancy value 518. As discussed above with regard to FIG. 4, the relevancy value 518 serves as a measure to indicate the overall relevance of the external website event 506 and to balance out the quality analysis value 514 and the tone analysis value 516.

Figure 6:
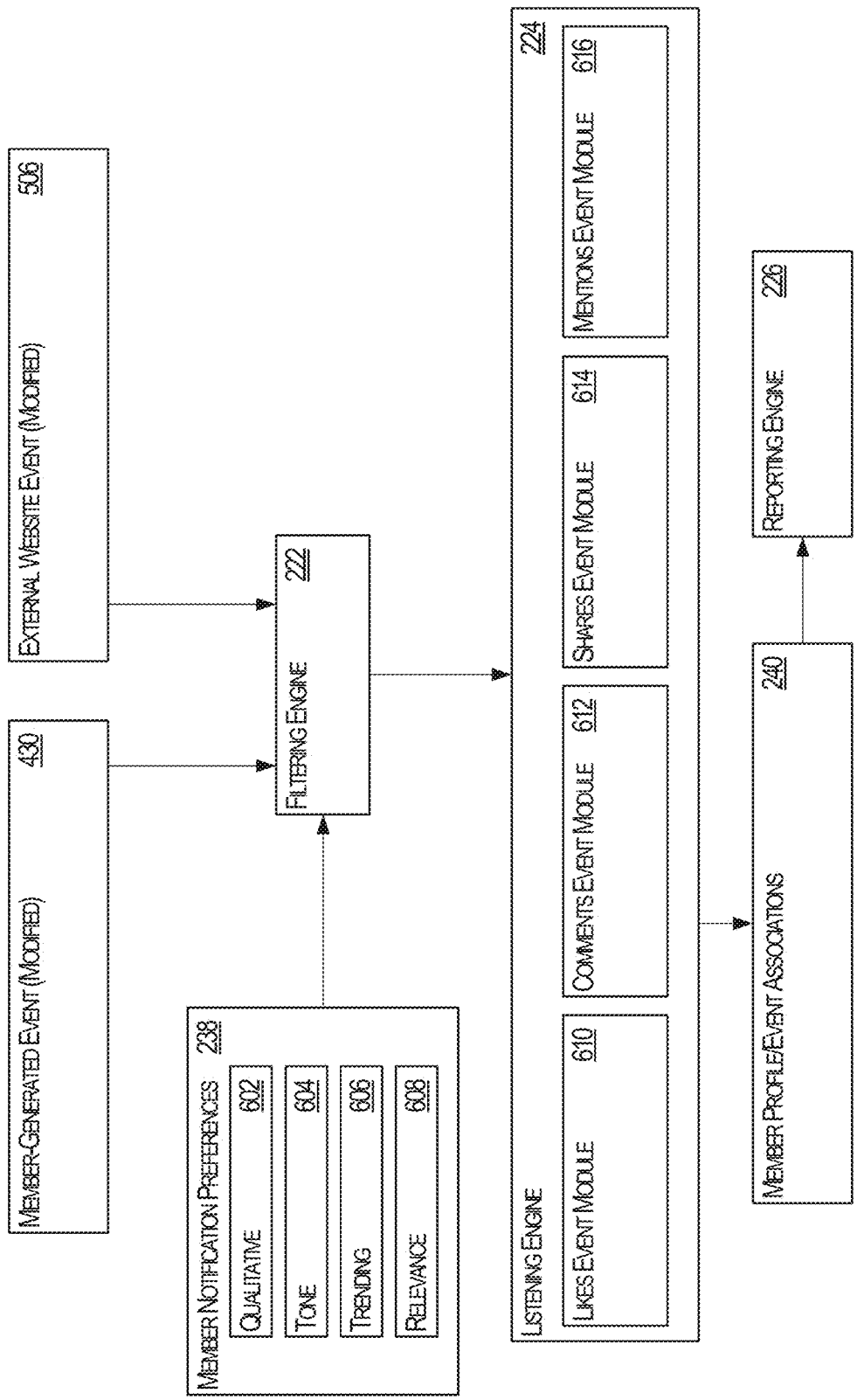
FIG. 6 is a block diagram illustrating applying member-selected preferences as a filter to modified events, in accordance with an example embodiment.

Having processed the one or more member-generated events 228 and the external website events 230, the processed events are then communicated to a filtering engine 222 before an administrative member is notified of such events. FIG. 6 is a block diagram illustrating applying member-selected preferences 238 as a filter to modified events 232, in accordance with an example embodiment. As shown in FIG. 6, the filtering engine 222 receives as input the modified member-generated events 430 and the modified external website events 506, and applies one or more member notification preferences 238 to filter out the events 430 and the events 506.

Initially, the filtering engine 222 determines which members are to receive the member-generated event 430 or the external website event 506. In one embodiment, the filtering engine 222 performs this determination by referencing the member activity database 116 and/or the member profile database 120 for the member-generated event 430. As discussed above, the social networking service monitors the actions 416 that cause member-generated events 228 and, as part of this monitoring, the social networking service identifies the member that initiated the action 416 and any members mentioned or referenced as a result of the action 416. A first member may "like" a post submitted by a second member and the social networking service maintains a record that the first member "liked" the submitted post. As the 2nd member is the originating member of the submitted post, the social networking service maintains a record of the post that he or she submitted along with any subsequent actions 416 performed by other members. Thus, the filtering engine 222 references these records to determine whether there is an originating member associated with the member-generated event 430, and retrieves the member notification preferences 238 corresponding to this originating member.

In some circumstances, the originating member will be a member who submits content 510 that references an organizational member of the social networking service. As such submissions are monitored by the social networking service, the social networking service identifies the referenced (or "targeted") member and creates a record in the member activity database 116 corresponding to the submission. In this regard, when the modified member-generated event 430 corresponds to a submission with a referenced member, the filtering engine 222 retrieves the member profile corresponding to the referenced member. Should the referenced member correspond to an organizational member, the filtering engine 222 then references the member profile database 120 to determine whether there is an administrative member associated with the organizational member. In this circumstance, when an administrative member is identified, the filtering engine 222 retrieves the member notification preferences 238 corresponding to the administrative member.

With regard to external website events 506, the filtering engine 222 handles them similarly to events where an organizational member is a referenced or targeted by a member. In this regard, the filtering engine 222 references the member profile identifiers 502 of the modified external website events 506 to identify the organizational members referenced or associated with the external website event 506. As explained previously, the filtering engine 222 then retrieves an organizational profile corresponding to the identified organizational member to determine whether administrative member is associated with the organizational member. Where administrative member is associated with the organizational member, the filtering engine 222 retrieves the member notification preferences 238 associated with the administrative member.

In this manner, the filtering engine 222 performs an initial assessment to determine which set or sets of member notification preferences 238 to retrieve to filter out the incoming member-generated events 430 and incoming external website events 506. The filtering engine 222 then applies the retrieved set or sets of member notification preferences 238 to the incoming events 430, 506.

In one embodiment, the member notification preferences 238 are established or defined by the administrative member. The member notification preferences 238 may apply to one or more administrative members for an organizational member or may apply to a particular administrative member. The member notification preferences 238 may include a qualitative preference 602, a tone preference 604, a trending preference 606, and a relevance preference 608. Each of the preferences 602-608 effectively establish a threshold by which corresponding values of the events 430 and events 506 are compared. Thus, for one or more of the incoming events 430, 506, the qualitative preference 602 is compared with the quality analysis value 514, the tone preference 604 is compared with the tone analysis values 516, the trending preference 606 is compared with the trending analysis value, and the relevance preference 608 is compared with the relevancy values.

While the filtering engine 222 may compare each of the analytic results 512 of the events 430 and the events 506 with the various preferences 602-608, an administrative member may configure the member notification preferences 238 in any combination of comparisons. Thus, the administrative member may define that only a single preference (e.g., the qualitative preference 602) should be evaluated or may define that three of the four preferences 602-608 should be evaluated. In this manner, the administrative member has a high degree of flexibility in determining the type of event he or she prefers to be notified about. For example, the administrative member may establish a low threshold for each of the preferences 602-608, in which case, it is likely that he or she will be notified of most (if not all) of the events 430, 506. As another example, the administrator may establish a high threshold for each of the preferences 602-608. In this second example, and with regard to the member-generated events 430, the administrative member would be notified of events that are associated with a high quality source, highly positive with respect to the organizational member associated with administrative member, are trending among members of the social networking service, and is, overall, a relevant event. In this manner, defining various different thresholds among the various preferences 602-608 provides a degree of control to the administrative member in the types of events he or she is notified about.

Where the member generated event 430 or the external website event 506 passes the filtering engine 222, the filtering engine 222 communicates the event to the listening engine 224. In one embodiment, an organizational member is assigned to, or associated with, a corresponding listening engine 224. Accordingly, in this embodiment, each organizational member is assigned a listening engine 224 that handles the identification and segregation of events as they are communicated by the filtering engine 222. However, in alternative embodiments, one or more listening engines 224 may be instantiated to handle the identification and segregation of events.

In one embodiment, the listening engine 224 includes a plurality of modules 610-616, where each module 610-616 is dedicated to identifying and handling a specific event type. In alternative embodiments, a single module or a different number of modules 610-616 are deployed.

As shown in FIG. 6, the listening engine 224 includes a likes event module 610 for events of the "likes" event type, a comments event module 612 for events of the "comments" event type, a shares event module 614 for events of the "shares" event type, and a mentions event module 616 for events of the "mentions" event type. In one embodiment, as events are communicated from the filtering engine 222 to the listening engine 224, each of the modules 610-616 parses the event to extract the event type associated with the event. When the corresponding module 610-616 identifies its assigned event type (e.g, the "likes" event module 610 identifies a "likes" event), the identifying module 610-616 then processes the identified event.

While FIG. 6 illustrates that the listening engine 224 includes four modules 610-616 of different event types, the social networking service may support other different types of event. Since the social networking service is dynamic and fluid, other event types may be added while the social networking service is in operation. Accordingly, the listening engine 224 implements a modular design in the sense that additional modules may be seamlessly incorporated into the listening engine 224 for detecting other event types. Thus, when a new event type is added to the social networking service, the listening engine 224 can be expanded with a new module that identifies and segregates the added event type.

As mentioned above, when a module 610-616 identifies a corresponding event (e.g., based on the assigned event type), the module 610-616 then processes the event. In one embodiment, processing the event includes updating the member profile/event associations 240. As discussed above, member profile/event associations 240 are those associations between a given member profile and generated events that include a member profile identifier 502 corresponding to the given member profile. In one embodiment, the member profile/event associations 240 are stored in an event database (not shown), which includes multiple database tables that each correspond to an event type identifiable by the listening engine 224. In an alternative embodiment, the database includes a single table that stores associations for all of the events identified by the listening engine 224. Other arrangements of the database are also possible, including varying the number of tables or implementing the database in a structurally different manner (e.g., as flat files or as an object-oriented database).

Figure 7:
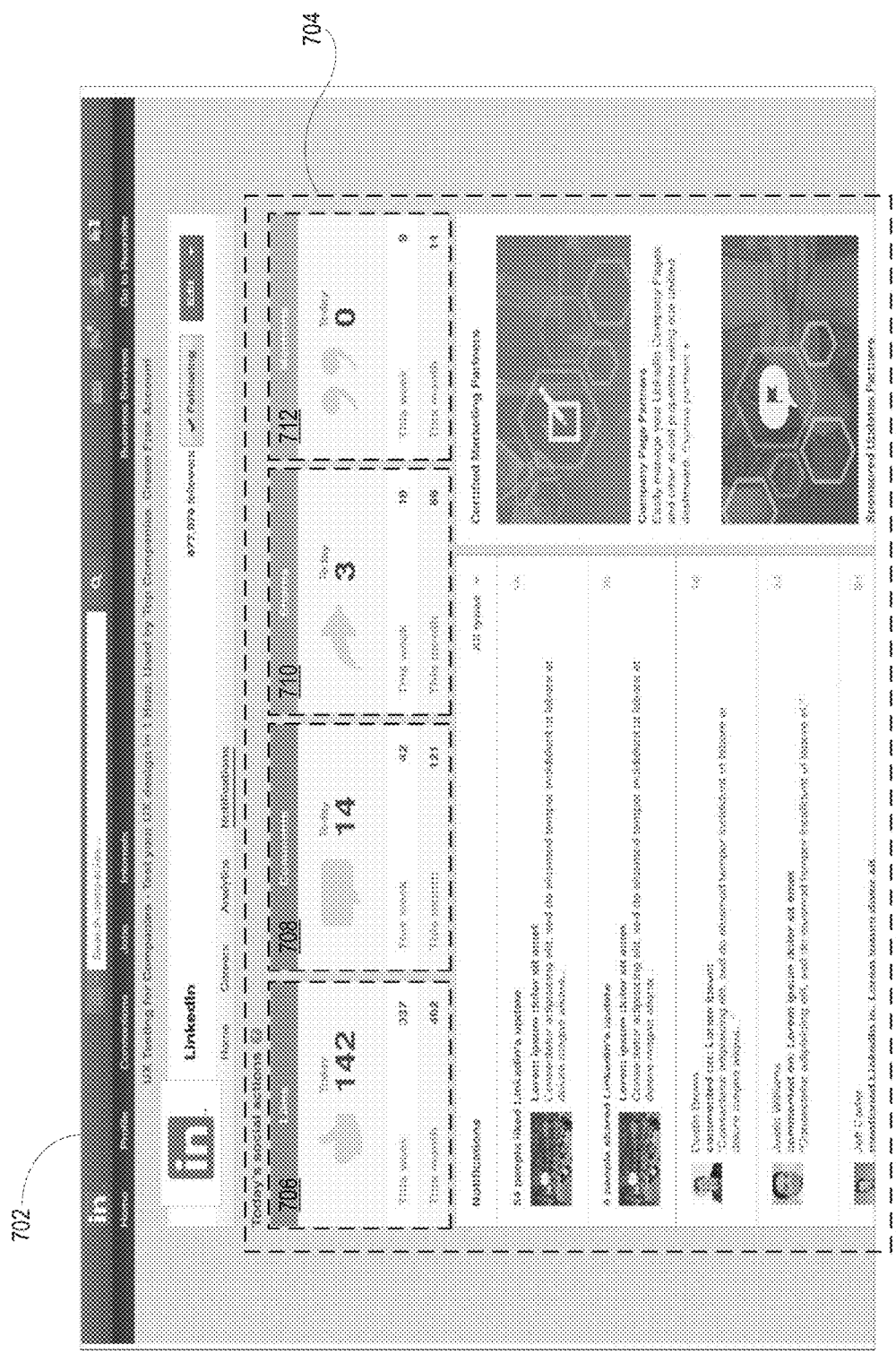
FIG. 7 illustrates a graphical user interface, in accordance with an example embodiment, of a centralized notification center for informing a member, authorized to act on behalf of the organization, of events.

As the listening engine 224 adds associations to the member profile/event associations 240, the reporting engine 226 is configured to detect and retrieve the events associated with the added associations. In one embodiment, the reporting engine 226 retrieves newly added events at periodic intervals, such as every minute, every 30 seconds, or at any other time interval. When the reporting engine 226 retrieves an event, the reporting engine 226 updates a centralized notification center (as illustrated in FIG. 7), which informs the administrative member of the newly added event. While, in one embodiment, the reporting engine 226 retrieves the event from the associations 240, in alternative embodiments, one of the modules 610-616, upon identifying a newly generated event, notifies the reporting engine 226 of the generated event. In these alternative embodiments, the reporting engine 226 updates the centralized notification center in response to the notification from the module 610-616.

FIG. 7 illustrates a graphical user interface 702, in accordance with an example embodiment, of a centralized notification center 704 for informing a member, authorized to act on behalf of the organization, of events. In one embodiment, the graphical user interface 702 for the centralized notification center 704 displays various types of notifications 706-712 that relate to the organization. In one embodiment, the notifications 706-712 correspond to the events communicated to the listening engine 224. Accordingly, in this embodiment, the notifications 706-712 include like-type notifications 706, comment-type notifications 708, shares-type notifications 710, and mentions-type notifications 712. A like-type notification 706 is a notification indicating which individual or organizational member has "liked" on an item of interest posted by, or is associated with, the organization. A comment-type notification 708 is a notification indicating which individual or organizational member has commented on an item of interest posted by, or is associated with, the organization. A shares-type notification 710 is a notification indicating which individual or organizational member has shared (e.g., with others) an item of interest posted by, or is associated with, the organization. Finally, a mentions-type notification 712 is a notification indicating which individual or organizational member has mentioned (e.g., in another item of interest) the organization. The notifications 706-712 may originate with a member-generated event 430 or with an external website event 506.

Each of the notifications 706-712 are displayable according to the retrieval/update process of the reporting engine 226. In particular, when the reporting engine 226 retrieves newly added associations (or, in alternative embodiments, is notified by one or more of the modules 610-616 of a new event), the reporting engine 226 updates corresponding notifications 706-712 in the centralized notification center 704. Updating the centralized notification center 704 includes several components that include, but are not limited to, a counter that indicates the number of notifications 706-712 received for a corresponding event type, a description or summary of the event added to the centralized notification center 704, and a selectable hyperlink included with the description or summary of the event that, when selected, causes the graphical user interface 702 to display the event or a webpage associated with the event (e.g., the webpage of the member profile that generated the event). Where the event is generated in response to an external website 304 having provided content 510 that mentions the member, the hyperlink includes a URL to the content 510 at the external website 304. The notification may further include a hyperlink or URL to external content, such as a webpage or website, where the notification is the result of an external website event 506.

In one embodiment, the graphical user interface 702 updates the display of the notifications 706-712 in substantially real-time. In other words, the centralized notification center 704 is updated with the events as they occur within the social networking service or as they are generated by the social networking service (e.g., based on information obtained from an external entity). In some embodiments, a member viewing the centralized notification center 704 need not refresh the webpage that displays the centralized notification center 704; rather, the notifications 706-712 on the centralized notification center 704 are updated without the member's intervention or interaction. As one of ordinary skill in the art will recognize, the updating to the centralized notification center 704 may be accomplished using one or more dynamic web technologies (e.g., dynamic HTML), such as by combining a static markup language (e.g., HTML), a client-side scripting language, such as JavaScript, a presentation definition language, such as CSS, and the Document Object Model.

Furthermore, and in one embodiment, each of the notifications 706-712 are filterable by type, such that the centralized notification center 704 displays a selected type of notification rather than all of the notifications 706-712 at one time. The filtering provided by the centralized notification center 704 is helpful in instances where a viewing member desires to view a specific type of notification (or the event associated with the notification) and would prefer not to see other types of notifications. For example, a viewing member may select to view likes-type events or comments-types events to the exclusion of other types of events. In this manner, the centralized notification center 704 can provide a streamlined interface for quickly viewing events that pertain to, or are relevant to, the organizational member.

In this manner, this disclosure provides systems and methods that that facilitate the display of events associated with an organizational member as those events are caused by members of the social networking service and by entities external to the social networking service. The technical effect of such systems and methods is that the organizational member is informed of the events as they occur, rather than requiring user interaction or member intervention to learn of such events. Moreover, a number of technologies are disclosed that facilitate the rapid dissemination of such events, such as the miniaturized interface, that allow a member to continue using the social networking service without having to specifically visit a separate webpage. Thus, the disclosed system and method present a technological advancement over current technologies relating to notifications 706-712 or social networking.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 8:
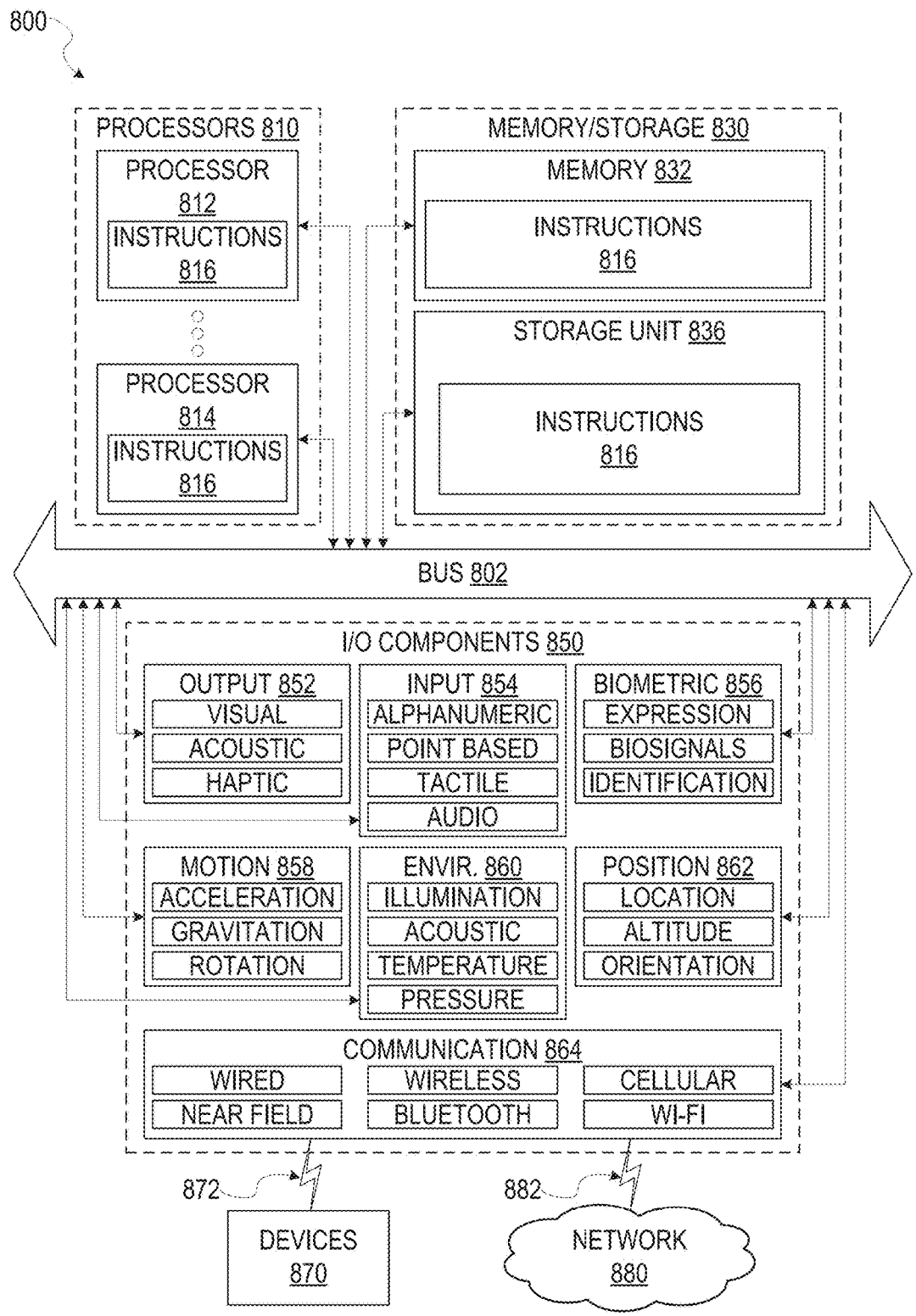
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the operations illustrated in FIGS. 3-6. Additionally, or alternatively, the instructions 816 may implement one or more of the components of FIGS. 1-2. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), or any machine 800 capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 812 and processor 814 that may execute instructions 816. The term "processor" is intended to include multi-core processors 810 that may comprise two or more independent processors 810 (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor), multiple processors 810 with a single core, multiple processors 810 with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines 800 such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a machine-readable memory storing computer-executable instructions; and
at least one hardware processor communicatively coupled to the machine-readable memory that, having executed the computer-executable instructions, is configured to:
monitor for an event having been generated in response to a determination that an entity has performed a predetermined action;
reference a first field of the event to determine whether the event was generated based on member activity of a social networking service or based on activity by a website external to the social networking service;
in response to a determination that the event was generated based on member activity, assign the event to a first event pipeline and modify the event based on a first plurality of analytics associated with the first event pipeline, wherein the first plurality of analytics is associated with the event having been generated based on the member activity;
in response to a determination that the event was generated based on activity by a website external to the social networking service, assign the event to a second event pipeline and modify the event based on a second plurality of analytics associated with the second event pipeline, wherein the second plurality of analytics is associated with the event having been generated based on the activity by the website external to the social networking service;
compare analytic data associated with the modified event with at least one member notification preference selected from a plurality of member notification preferences associated with a member of the social networking service to determine whether the member is to be notified of the activity associated with the modified event; and
update a centralized notification center displayable to the member with a notification of the activity where the comparison results in a determination that the member is to be notified.

2. The system of claim 1, wherein the entity comprises the website external to the social networking service and the predetermined action comprises the website making content publicly available.

3. The system of claim 1, wherein the at least one hardware processor is further configured to analyze the content associated with the generated event by performing a tone analysis on the content, the tone analysis resulting in a tone analysis value that indicates the tone of the content.

4. The system of claim 1, wherein the at least one hardware processor is further configured to analyze the content associated with the generated event by performing a trend analysis on the content, the trend analysis resulting in a trend analysis value that indicates whether the content is trending among a plurality of members of the social networking service.

5. The system of claim 1, wherein the plurality of member notification preferences include at least one of a quality preference that indicates a quality threshold for the content, a tone preference that indicates a tone threshold for the content, or a trending preference that indicates a trending threshold for the content.

6. The system of claim 1, wherein the assignment of the generated event to the first or second pipeline is further dependent upon whether the entity is a member of the social networking service or a website external to the social networking service.

7. The system of claim 1, wherein the at least one hardware processor is further configured to modify the generated event to include at least one member profile identifier selected from a plurality of member profile identifiers depending upon whether the content mentions a member corresponding to the at least one member profile.

8. A method comprising:
monitoring, by at least one hardware processor, for an event having been generated in response to a determination that an entity has performed a predetermined action;
referencing a first field of the event to determine whether the event was generated based on member activity of a social networking service or based on activity by a website external to the social networking service;
in response to a determination that the event was generated based on member activity, assigning the event to a first event pipeline and modifying the event based on a first plurality of analytics associated with the first event pipeline, wherein the first plurality of analytics is associated with the event having been generated based on the member activity;
in response to a determination that the event was generated based on activity by a website external to the social networking service, assigning the event to a second event pipeline and modifying the event based on a second plurality of analytics associated with the second event pipeline, wherein the second plurality of analytics is associated with the event having been generated based on the activity by the website external to the social networking service;
comparing, by the at least one hardware processor, analytic data associated with the modified event with at least one member notification preference selected from a plurality of member notification preferences associated with a member of the social networking service to determine whether the member is to be notified of the activity associated with the modified event; and updating, by the at least one hardware processor, a centralized notification center displayable to the member with a notification of the activity where the comparison results in a determination that the member is to be notified.

9. The method of claim 8, wherein the entity comprises the website external to the social networking service and the predetermined action comprises the website making content publicly available.

10. The method of claim 8, wherein analyzing the content associated with the generated event comprises performing a tone analysis on the content, the tone analysis resulting in a tone analysis value that indicates the tone of the content.

11. The method of claim 8, wherein analyzing the content associated with the generated event comprises performing a trend analysis on the content, the trend analysis resulting in a trend analysis value that indicates whether the content is trending among a plurality of members of the social networking service.

12. The method of claim 8, wherein the plurality of member notification preferences include at least one of a quality preference that indicates a quality threshold for the content, a tone preference that indicates a tone threshold for the content, or a trending preference that indicates a trending threshold for the content.

13. The method of claim 8, wherein assigning the generated event to the first or second pipeline is further dependent upon whether the entity is a member of the social networking service or a website external to the social networking service.

14. The method of claim 8, further comprising:
modifying the generated event to include at least one member profile identifier selected from a plurality of member profile identifiers depending upon whether the content mentions a member corresponding to the at least one member profile.

15. A computer-readable memory having computer-executable instructions stored thereon that, when executed by at least one hardware processor, causes the at least one hardware processor to perform a plurality of operations, the plurality of operations comprising:
monitoring for an event having been generated in response to a determination that an entity has performed a predetermined action;
referencing a first field of the event to determine whether the event was generated based on member activity of a social networking service or based on activity by a website external to the social networking service;
in response to a determination that the event was generated based on member activity, assigning the event to a first event pipeline and modifying the event based on a first plurality of analytics associated with the first event pipeline, wherein the first plurality of analytics is associated with the event having been generated based on the member activity;
in response to a determination that the event was generated based on activity by a website external to the social networking service, assigning the event to a second event pipeline and modifying the event based on a second plurality of analytics associated with the second event pipeline, wherein the second plurality of analytics is associated with the event having been generated based on the activity by the website external to the social networking service;
comparing analytic data associated with the modified event with at least one member notification preference selected from a plurality of member notification preferences associated with a member of the social networking service to determine whether the member is to be notified of the activity associated with the modified event; and
updating a centralized notification center displayable to the member with a notification of the activity where the comparison results in a determination that the member is to be notified.

16. The computer-readable memory of claim 15, wherein analyzing the content associated with the generated event comprises performing a tone analysis on the content, the tone analysis resulting in a tone analysis value that indicates the tone of the content.

17. The computer-readable memory of claim 15, wherein analyzing the content associated with the generated event comprises performing a trend analysis on the content, the trend analysis resulting in a trend analysis value that indicates whether the content is trending among a plurality of members of the social networking service.

18. The computer-readable memory of claim 15, wherein the plurality of member notification preferences include at least one of a quality preference that indicates a quality threshold for the content, a tone preference that indicates a tone threshold for the content, or a trending preference that indicates a trending threshold for the content.

19. The computer-readable memory of claim 15, wherein assigning the generated event to the first or second pipeline is further dependent upon whether the entity is a member of the social networking service or a website external to the social networking service.

20. The computer-readable memory of claim 15, wherein the plurality of operations further comprise:
modifying the generated event to include at least one member profile identifier selected from a plurality of member profile identifiers depending upon whether the content mentions a member corresponding to the at least one member profile.

* * * * *

UNITED STATES PATENT AND TRADEMARK OFFICE
CERTIFICATE OF CORRECTION

PATENT NO. : 10,230,775 B2
APPLICATION NO. : 14/953911
DATED : March 12, 2019
INVENTOR(S) : Pinkovezky et al.

Page 1 of 1

It is certified that error appears in the above-identified patent and that said Letters Patent is hereby corrected as shown below:

In the Claims

In Column 27, Line 41, in Claim 1, delete "deter mine" and insert --determine-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*